United States Patent

Elgee et al.

[11] Patent Number: 6,017,114
[45] Date of Patent: Jan. 25, 2000

[54] SHIFTED ELEMENT SCANNING/PRINTING ROUTINE COORDINATED WITH MEDIA ADVANCE

[75] Inventors: Steven B. Elgee, Portland, Oreg.; Steve O. Rasmussen; Robert P. Callaway, both of Vancouver, Wash.

[73] Assignee: Hewlett-Packard Company, Palo Alto, Calif.

[21] Appl. No.: 09/164,439

[22] Filed: Sep. 30, 1998

[51] Int. Cl.[7] .................. B41J 2/145; B41J 2/15; B41J 29/38
[52] U.S. Cl. .................................... 347/40; 347/16
[58] Field of Search .................. 347/104, 40, 16, 347/37; 346/139 D, 104; 341/11

[56] References Cited

U.S. PATENT DOCUMENTS

| | | | |
|---|---|---|---|
| 4,335,306 | 6/1982 | Gort et al. | 250/231.14 |
| 4,572,952 | 2/1986 | March | 250/237 G |
| 4,602,242 | 7/1986 | Kimura | 341/13 |
| 4,631,519 | 12/1986 | Johnston | 341/13 |
| 4,644,157 | 2/1987 | Ozawa et al. | 250/231.16 |
| 4,734,868 | 3/1988 | DeLacy | 347/16 |
| 4,736,187 | 4/1988 | Kibrick et al. | 341/3 |
| 4,789,874 | 12/1988 | Majette et al. | 347/37 |
| 4,803,354 | 2/1989 | Onodera et al. | 250/231.16 |
| 4,990,767 | 2/1991 | Ernst et al. | 250/231.16 |
| 5,457,371 | 10/1995 | Gordon | 318/661 |
| 5,598,201 | 1/1997 | Stodder et al. | 347/104 |
| 5,774,074 | 6/1998 | Cooper et al. | 341/11 |

OTHER PUBLICATIONS

"Hewlett–Packard 3820A Electronic Total Station" Service Manual, Nov. 1979.
Commonly–assigned, co–pending U.S. Patent Application No. 08/840,079, filed Apr. 9, 1997, entitled "Position Encoder".

Primary Examiner—N. Le
Assistant Examiner—Thinh Nguyen
Attorney, Agent, or Firm—Flory L. Martin

[57] ABSTRACT

A shifted element printing/scanning routine coordinated with media advance through an interaction zone of hardcopy device is provided for inkjet printing mechanisms, scanners or multi-function hardcopy devices. A method is provided of coordinating operation of a reciprocating head with media advance. The head has plural interaction elements, which may be ink-ejecting nozzles in a printing mechanism, or image receptors in a scanning mechanism, with the interaction elements being arranged in a linear array to selectively interact with media. A hardcopy device has a rotating media advancing member, a reciprocating head carrying the interaction elements, an encoder having indicia to track media advance, and a sensor that interprets the encoder indicia and generated a media position signal. A controller adjusts the media advance and shifts operation of selected interaction elements to other interaction elements along the linear array to avoid an indeterminate region of the position signal where the media position cannot be ascertained.

20 Claims, 5 Drawing Sheets

SHIFTED ELEMENT SCANNING/PRINTING ROUTINE COORDINATED WITH MEDIA ADVANCE

FIELD OF THE INVENTION

The present invention relates generally to hardcopy devices having a reciprocating head, such as scanners, inkjet printing mechanisms and multi-function hardcopy devices having both scanning and printing capabilities. More particularly, the present invention relates to a new coordinated operation of the reciprocating head in conjunction with the media advance through an interaction zone of the hardcopy device, which reduces the number of expensive components required to assemble the hardcopy device, leading to a more economical product for consumers.

BACKGROUND OF THE INVENTION

Hardcopy devices having a reciprocating head come in a variety of configurations, including inkjet printing mechanisms that use cartridges, often called "pens," which eject drops of liquid colorant, referred to generally herein as "ink," onto print media, such as a page of paper. Each pen has a printhead formed with very small nozzles through which the ink drops are fired. To print an image, the printhead is propelled through a printzone back and forth across the page, ejecting drops of ink in a desired pattern as it moves. By selectively energizing the resistors as the printhead moves across the page, the ink is expelled in a pattern on the print media to form a desired image (e.g., picture, chart or text). The nozzles are typically arranged in linear arrays usually located side-by-side on the printhead, parallel to one another, and perpendicular to the scanning direction of the printhead, with the length of the nozzle arrays defining a print swath or band. That is, if all the nozzles of one array were continually fired as the printhead made one complete traverse through the printzone, a band or swath of ink would appear on the sheet. The width of this band is known as the "swath height" of the pen, the maximum pattern of ink which can be laid down in a single pass. The print media, such as a sheet of paper, is moved through the printzone typically one swath width at a time, although some print schemes move the media incrementally by, for instance, halves or quarters of a swath width for each printhead pass to obtain a shingled drop placement which enhances the appearance of the final image.

The particular ink ejection mechanism within the printhead may take on a variety of different forms known to those skilled in the art, such as those using piezo-electric or thermal printhead technology. For instance, earlier thermal ink ejection mechanisms are shown in U.S. Pat. Nos. 5,278,584 and 4,683,481. In a thermal system, a barrier layer containing ink channels and vaporization chambers is located between a nozzle orifice plate and a substrate layer. This substrate layer typically contains linear arrays of heater elements, such as resistors, which are energized to heat ink within the vaporization chambers. Upon heating, an ink droplet is ejected from a nozzle associated with the energized resistor.

As the inkjet industry investigates new printhead designs, one trend is toward using a "snapper" reservoir system where permanent or semi-permanent printheads are used and a reservoir carrying a fresh ink supply is snapped into place on the printhead. Another new design uses permanent or semi-permanent printheads in what is known in the industry as an "off-axis" printer. In an off-axis system, the printheads carry only a small ink supply across the printzone, with this supply being replenished through tubing that delivers ink from an "off-axis" stationary reservoir placed at a remote stationary location within the printer. Another inkjet system uses a "replaceable cartridge" where a disposable printhead is permanently attached to the ink supply, so when the ink reservoir is emptied, the entire cartridge including the printhead is replaced. A replaceable cartridge system assures the customer has a fresh, new printhead each time the ink supply is replaced. Some replaceable cartridges are monochrome (single color), for instance, carrying only black ink, while other cartridges are multi-color, typically carrying cyan, magenta and yellow inks. Some printing mechanisms use four monochrome cartridges, while others use a black monochrome cartridge in combination with a tri-color cartridge.

Whether the printing mechanism uses either a snapper cartridge system, an off-axis system, a replaceable cartridge system or some other inkjet system, drop placement on the media must be coordinated with the incremental advance of the media through the printzone for sharp, vivid images and text, which are free of print defects, such as color banding, improper spacing, printed line overlapping. Many types of inkjet printing mechanisms use a series of conventional paper drive rollers or tires to frictionally engage the print media and incrementally the media through the printzone, moving either a full or fractional swath width. To provide feedback to the printer controller regarding the location of the media with respect to the printhead, more recent printers, such as the DeskJet® 720C and 722C models of inkjet printers, manufactured by the present assignee, the Hewlett-Packard Company of Palo Alto, Calif., have incorporated an optical encoder wheel on the axle of the media advance tires. This system required two optical sensors to read the encoder wheel and correct for any eccentricity of the code wheel, as described in U.S. Pat. No. 5,774,074, which is assigned to the present assignee, the Hewlett-Packard Company. To determine the direction of rotation, one of these optical sensors was an expensive two-channel analog sensor that measured two signals which were in quadrature, that is, 90° apart. These two signals were compared by the printer controller to determine which quadrature signal was rising first, and from this information, the direction of rotation was determined. Thus, it would be desirable to replace the most expensive one of these optical sensors with a more economical sensor, while also implementing a new printing routine that increases printing speed, to provide consumers with a faster, more economical printing unit.

Other hardcopy devices include scanners which have a scanhead with image receptors that "read" an image previously printed on media, and convert this image into an electronic file which may then be computer edited, or sent to a selected destination via either electronic mail (E-Mail) or facsimile transmitted over telephone lines, for instance. The image receptors in a scanhead may be a series of discrete elements arranged in a linear array, as described above for an inkjet printhead. These hardcopy scanning mechanisms may use the same media advance system as described above for an inkjet printing mechanism, and indeed, in many multi-function devices the same media advance system is used for both printing and scanning.

As a more general concept, both inkjet printheads and scanheads may be considered as "image transceiver heads," with printheads transceiving an image by printing that image on media, while scanheads transceive an image by "reading" an image that already exists on media. This generic image transceiver head may have one or more arrays of discrete interaction elements arranged, for instance, in a linear array, to selectively interact with media in an interaction zone of the hardcopy device. For a printing mechanism, the interaction elements are ink-ejecting nozzles and the interaction zone is a printzone. For a scanning mechanism, the interaction elements are image receptors and the interaction zone is a readzone, although in some multi-function devices, the printzone and readzone may both physically occupy the same location adjacent the media advance path.

SUMMARY OF THE INVENTION

According to one aspect of the present invention, a method of printing an image at a desired location on media in a printzone of an inkjet printing mechanism using an inkjet printhead having plural ink-ejecting nozzles arranged in a linear array. The method includes the step of proposing an initial media step to advance the media through the printzone. In a generating step, a media position signal indicative of the position of the media in the printzone is generated. The media position signal has an indeterminate region during which the media position cannot be ascertained. In a predicting step, a prediction is made as to whether the initial media step positions the media where the media position signal is in the indeterminate region. In a selecting step, nozzles are selected to print the image at the desired location on the media. When the predicting step determines the media position signal is in the indeterminate region, a new media step is established to advance the media through the printzone, and the selected nozzles are shifted to other nozzles along the linear array. In an advancing step, the media is advanced by the new media step, and following the advancing step, ejecting ink from said other nozzles in the linear array to print the image on the media at the desired location.

According to a further aspect of the present invention, an inkjet printing mechanism is provided with an inkjet printhead having plural ink-ejecting nozzles arranged in a linear array to selectively eject ink in a printzone in response to a firing signal to print an image on media at a desired location. A media advancing member rotates to advance media through the printzone in response to a media advance signal to receive ink ejected from selected nozzles. An encoder member is coupled to rotate with the media advancing member, with the encoder member having indicia. The printing mechanism also has a sensor member positioned to interpret the indicia of the encoder member and generate a media position signal indicative of the position of the media in the printzone. The media position signal has an indeterminate region during which the media position cannot be ascertained. The printing mechanism also has a controller that generates the media advance signal and the firing signal, with the controller (a) adjusting the media advance signal to avoid moving the media to a position where the media position signal is in the indeterminate zone and (b) shifting said selected nozzles to other nozzles along the linear array to print the image at the desired location on media.

According to an additional aspect of the present invention, a method is provided of coordinating operation of a reciprocating head with media advance through an interaction zone of a hardcopy device across which the head reciprocates. The head has plural interaction elements arranged in a linear array to selectively interact with media in the interaction zone. The method includes the step of proposing an initial media step to advance the media through the interaction zone. In a generating step, a media position signal indicative of the position of the media in the interaction zone is generated, with the media position signal having an indeterminate region during which the media position cannot be ascertained. In a predicting step, a prediction is made as to whether the initial media step positions the media where the media position signal is in the indeterminate region. In a selecting step, interaction elements are selected to interact with the media at a desired location on the media. When the predicting step determines the media position signal is in the indeterminate region, in an establishing step, a new media step is established to advance the media through the interaction zone, and in a shifting step, the selected interaction elements are shifted to other interaction elements along the linear array. In an advancing step, the media is advanced the new media step. Following the advancing step, in a reciprocating step, the head is reciprocated through the interaction zone while operating said other interaction elements in the linear array to interact with the media at the desired location.

According to yet another aspect of the present invention, a hardcopy device is provided with a media advancing member which advances media in a first direction through an interaction zone in response to a media advance signal. A reciprocating head has plural interaction elements arranged in a linear array substantially parallel to the first direction, with selected interaction elements interacting with media in the interaction zone. The hardcopy device also has an encoder member bearing indicia to track media advance through the interaction zone. A sensor member is positioned to interpret the indicia of the encoder member and generate a media position signal indicative of the position of the media in the interaction zone, with the media position signal having an indeterminate region during which the media position cannot be ascertained. The hardcopy device also has a controller which generates the media advance signal, and adjusts the media advance signal to avoid moving the media to a position where the media position signal is in the indeterminate region, wherein the controller is in communication with the plural interaction elements to shift said selected interaction elements to other interaction elements along the linear array to transceive the image at a desired location on the media. An overall goal of the present invention is to provide an inkjet printing mechanism with new printing routine which is coordinated with the media advance through a printzone, along with a method of performing this new printing routine.

Another goal of the present invention is to provide an inkjet printing mechanism which uses fewer components to provide consumers with a more economical inkjet printing unit.

DETAILED DESCRIPTION OF A PREFERRED EMBODIMENT

Figure 1:
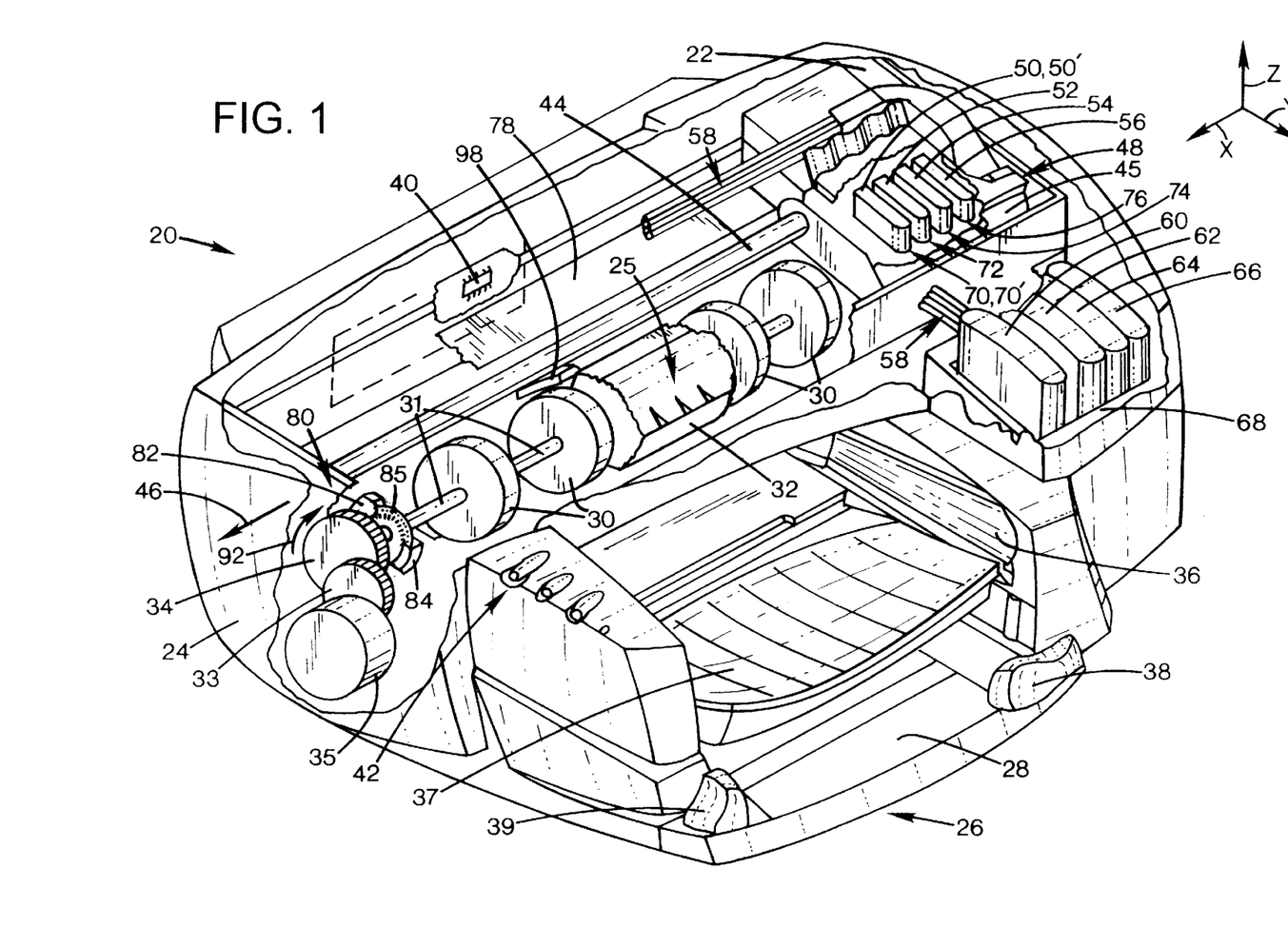
FIG. 1 is a perspective view of one form of hardcopy device which may be constructed to perform printing and/or scanning functions using a shifted element printing and/or scanning routine of the present invention which is coordinated with the media advance through an interaction zone of the hardcopy device.

FIG. 1 illustrates an embodiment of a hardcopy device 20 having a reciprocating head, which may be constructed in accordance with the present invention such as a scanner, an inkjet printing mechanism, or multi-function hardcopy device having both scanning and printing capabilities. Initially, for the purposes of illustration, the hardcopy device 20 is described as an inkjet printing mechanism, here shown as an "off-axis" inkjet printer 20, constructed in accordance with the present invention, which may be used for printing for business reports, correspondence, desktop publishing, and the like, in an industrial, office, home or other environment. A variety of inkjet printing mechanisms are commercially available. For instance, some of the printing mechanisms that may embody the present invention include plotters, portable printing units, copiers, cameras, video printers, and facsimile machines, to name a few, as well as various combination devices, such as a combination facsimile/printer which has both scanning and printing capabilities. For convenience the concepts of the present invention are illustrated first in the environment of an inkjet printer 20.

While it is apparent that the printer components may vary from model to model, the typical inkjet printer 20 includes a frame or chassis 22 surrounded by a housing, casing or enclosure 24, typically of a plastic material. Sheets of print media are fed by a media handling system 26 through an interaction zone 25, which for a scanner would be a scanzone, while for the illustrated printer 20 the interaction zone is a printzone. The print media may be any type of suitable sheet material, such as paper, card-stock, transparencies, photographic paper, fabric, mylar, and the like, but for convenience, the illustrated embodiment is described using paper as the print medium. The media handling system 26 has a feed tray 28 for storing sheets of paper before printing or before scanning. A series of conventional paper drive rollers or tires 30 are mounted on axle 31 which is pivotally supported by the chassis 22. Also mounted on axle 31 is a pivot member 32 which supports the underside of the media during printing in the printzone 25. The drive tires 30 are driven through a drive gear assembly having a transfer gear 33 and a bull gear 34, which is mounted on axle 31 to drive the tires 30.

The transfer gear 33 is driven by a stepper motor 35, with the motor 35 and gear assembly 33, 34 selectively rotating the tires 30 to move the print media from the input supply tray 28, through the printzone 25, and after printing or scanning, onto a pair of extended output drying wing members, such as wing 36, shown in a retracted or rest position in FIG. 1. The wings 36 momentarily hold a newly printed sheet above any previously printed sheets still drying in an output tray portion 37, then the wings 36 retract to the sides to drop the newly printed sheet into the output tray 37. The media handling system 26 may include a series of adjustment mechanisms for accommodating different sizes of print media, including letter, legal, A-4, envelopes, etc., such as a sliding length adjustment lever 38 and a sliding width adjustment lever 39.

Figure 2:
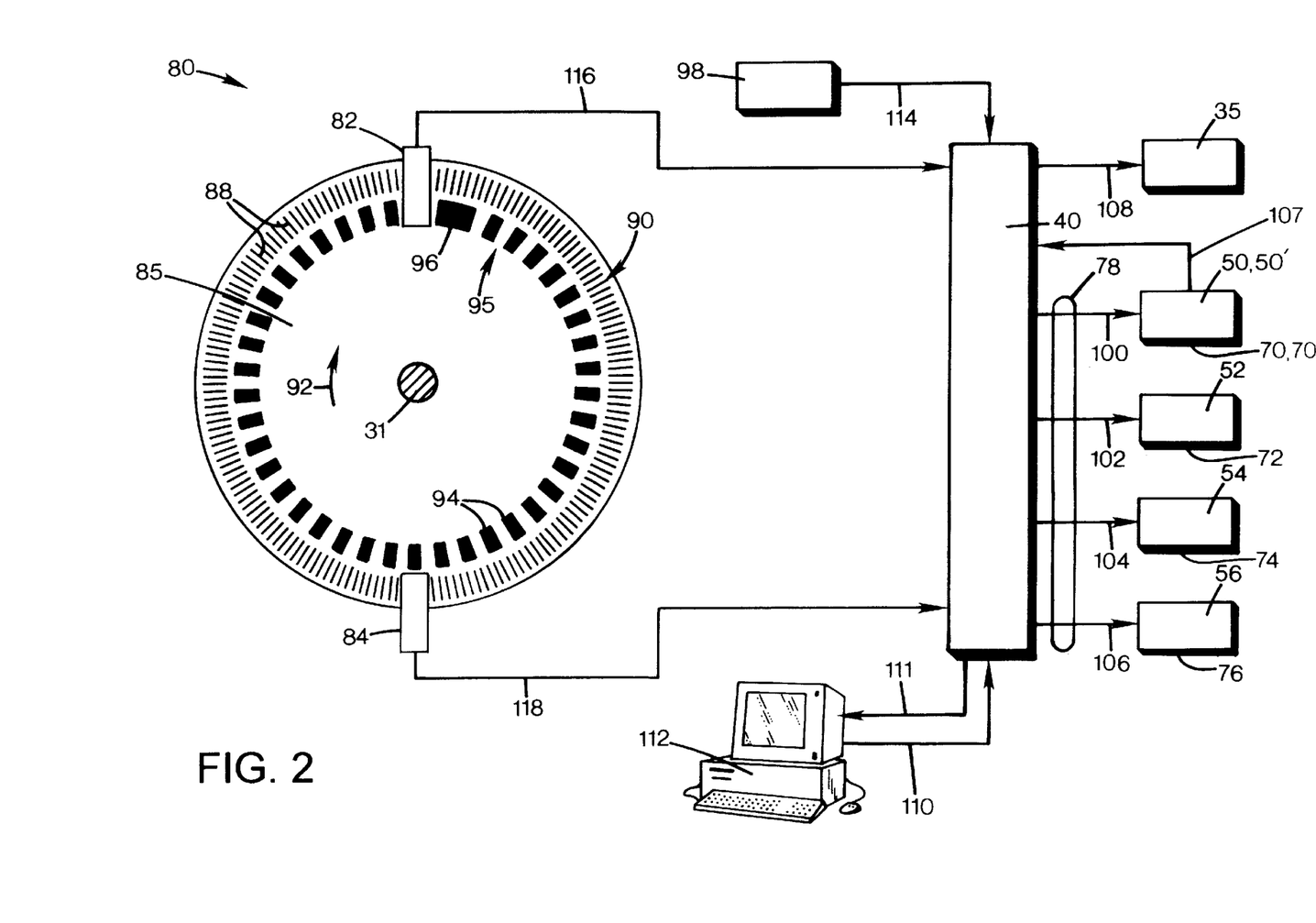
FIG. 2 is a partially schematic view of the shifted element routine system of FIG. 1, including one form of a streamlined optical encoder system of the present invention.

The printer 20 also has a printer controller, illustrated schematically as a microprocessor 40, that receives instructions from a host device, typically a computer, such as a personal computer 112 (FIG. 2). Indeed, many of the printer controller functions may be performed by the host computer 112, by the electronics on board the printer, or by interactions therebetween. As used herein, the term "printer controller 40" encompasses these functions, whether performed by the host computer, the printer, an intermediary device therebetween, or by a combined interaction of such elements. The printer controller 40 may also operate in response to user inputs provided through a key pad 42 located on the exterior of the casing 24. A monitor coupled to the computer host may be used to display visual information to an operator, such as the printer status or a particular program being run on the host computer. Personal computers, their input devices, such as a keyboard and/or a mouse device, and monitors are all well known to those skilled in the art.

A carriage guide rod 44 is supported by the chassis 22 to slidably support a reciprocating head carriage system 45 for travel back and forth across the printzone 25 along a scanning axis 46, which is parallel to the X-axis of the XYZ coordinate system shown in FIG. 1. The carriage 45 is also propelled along guide rod 44 into a servicing region, as indicated generally by arrow 48, located within the interior of the housing 24. To clean and protect the printhead, typically a "service station" mechanism (not shown) is supported by the printer chassis in the servicing region 48 for printhead maintenance, including a capping system which substantially seals the printhead nozzles from contaminants and drying for storage or during non-printing periods. Some capping systems are also designed to facilitate priming, such as by being connected to a pumping unit that draws a vacuum to remove printhead ink clogs. During operation, printhead blockages are periodically cleared by firing a number of drops of ink in a process known as "spitting," with the waste ink being collected in a "spittoon" reservoir portion of the service station. After spitting, uncapping, or occasionally during printing, most service stations have an elastomeric wiper that wipes away ink residue, as well as any paper dust or other debris that has collected on the printhead.

To propel the carriage 45 across the printzone 25 and into the servicing region 48, a conventional carriage drive gear and DC (direct current) motor assembly may be coupled to drive an endless belt (not shown), which may be secured in a conventional manner to the carriage 45, with the DC motor operating in response to control signals received from the controller 40 to incrementally advance the carriage 45 along guide rod 44. To provide carriage positional feedback information to printer controller 40, a conventional encoder strip may extend along the length of the printzone 25 and over the service station area 48, with a conventional optical encoder reader being mounted on the back surface of printhead carriage 45 to read positional information provided by the encoder strip. The manner of providing positional feedback information via an encoder strip reader may be accomplished in a variety of different ways known to those skilled in the art.

The carriage 45 reciprocally carries one or more image transceiver heads across the interaction zone, and when the hardcopy device 20 is constructed as a printer, across the printzone 25 where the media sheet 34 receives ink from an inkjet cartridge, such as a black ink cartridge 50 and three monochrome color ink cartridges 52, 54 and 56, shown schematically in FIG. 2. The cartridges 50–56 are also often called "pens" by those in the art. The black ink pen 50 is illustrated herein as containing a pigment-based ink. While the illustrated color pens 52–56 each contain a dye-based ink of the colors cyan, magenta and yellow, respectively. It is apparent that other types of inks may also be used in pens 50–56, such as paraffin-based inks, as well as hybrid or composite inks having both dye and pigment characteristics. The illustrated pens 50–56 each include small reservoirs for storing a supply of ink in what is known as an "off-axis" ink delivery system, which is in contrast to a replaceable cartridge system where each pen has a reservoir that carries the entire ink supply as the printhead reciprocates over the printzone 25 along the scan axis 46. Hence, the replaceable cartridge system may be considered as an "on-axis" system, whereas systems which store the main ink supply at a stationary location remote from the printzone scanning axis are called "off-axis" systems.

In the illustrated off-axis printer 20, ink of each color for each printhead is delivered via a conduit or tubing system 58 from a group of main stationary reservoirs 60, 62, 64 and 66 to the on-board reservoirs of pens 50, 52, 54 and 56, respectively. The stationary or main reservoirs 60–66 are replaceable ink supplies stored in a receptacle 68 supported by the printer chassis 22. Each of pens 50, 52, 54 and 56 have printheads 70, 72, 74 and 76, respectively, which selectively eject ink to from an image on a sheet of media in the printzone 25. The concepts disclosed herein for printing with the printheads 70–76 apply equally to the totally replaceable inkjet cartridges and replaceable reservoir or "snapper" cartridges, as well as to the illustrated off-axis semi-permanent or permanent printheads.

The printheads 70, 72, 74 and 76 each have an orifice plate with a plurality of discrete interaction elements, here ink-ejecting nozzles, formed therethrough in a manner well known to those skilled in the art. The nozzles of each printhead 70–76 are typically formed in at least one, but typically two linear arrays along the orifice plate, a portion of which is illustrated in greater detail below with respect to FIGS. 6 and 7. Thus, the term "linear" as used herein may be interpreted as "nearly linear" or substantially linear, and may include discrete element arrangements slightly offset from one another, for example, in a zigzag arrangement. Each linear array is typically aligned in a longitudinal direction perpendicular to the scanning axis 46 and parallel with the Y-axis of FIG. 1, with the length of each array determining the maximum image swath for a single pass of the printhead. The illustrated printheads 70–76 are thermal inkjet printheads, although other types of printheads may be used, such as piezoelectric printheads. The thermal printheads 70–76 typically include a plurality of resistors which are associated with the nozzles. Upon energizing a selected resistor, a bubble of gas is formed which ejects a droplet of ink from the nozzle and onto a sheet of paper in the printzone 25 under the nozzle. The printhead resistors are selectively energized in response to firing command control signals delivered by a multi-conductor strip 78 from the controller 40 to the printhead carriage 45.

While the hardcopy device 20 has been described in terms of an inkjet printer, it is apparent to those skilled in the art that with minor modifications, the device 20 may also be constructed as a scanner, or as a multi-function mechanism having both printing and scanning capabilities. For instance, the black cartridge 50 may be replaced with a scanner cartridge 50' having a scanhead 70' for a multifunction machine, with the color black being printed as a "composite black," where each of the three color pens 52–56 deposit a droplet at the same location to form a black dot on the print media. Alternatively, the carriage 45 may also transport a scanhead (not shown) in addition to the cartridges 50–52. In a further alternate hardcopy device, the black pen 50 may be constructed as a scanner cartridge 50', with cartridges 52–56 being omitted to form a scanner only, or to form a dedicated scanning portion of a multi-function hardcopy device. When the hardcopy device 20 is constructed for image scanning capabilities, the image transceiver head has discrete interaction elements each comprising an image receptor, as illustrated further below with respect to FIGS. 6 and 7. Preferably, the image receptors are arranged on the scanhead 70' in a linear array, parallel with the Y-direction of media travel through the interaction zone 25. Of course, when the hardcopy device 20 has image scanning capabilities, the controller 40 receives a scan signal from the scanning device 50', indicative of an image previously recorded on the print media.

Shifted Element Printing/Scanning Routine
Coordinated with the Media Advance

FIG. 2 illustrates one form of a media movement feedback system as a streamlined optical encoder system 80, constructed in accordance with the present invention for monitoring media movement through the printzone 25, which is used to perform a shifted element printing and/or scanning routine coordinated with media advance, in accordance with the present invention. The encoder system 80 includes two, single-channel, analog, optical encoder sensors 82 and 84, which are supported by the chassis 22 to read markings on a code disk or encoder wheel 85. The encoder wheel 85 is mounted to rotate with axle 31 to move two series of concentric indicia past the sensors 82 and 84. The first set of indicia is illustrated as a series of radial markings 88 arranged in an outer circular track 90, which moves past the outermost sensor 84 when the media is advanced through the printzone 25 as axle 31 rotates in the direction of curved arrow 92. The other set of indicia carried by the encoder wheel 85 is a series of radial markings 94 arranged in an inner circular track 95 which moves past the innermost sensor 82 when the tire axle 31 rotates.

Preferably, the inner track 95 has a number of equally spaced markings 94, such as on the order of forty-eight (48) markings 94. The outer track 90 has on the order of nine-hundred-sixty (960) equally spaced markings, with each marking 94 of the inner track 95 corresponding to twenty (20) markings 88 of the outer track 90, which is represented schematically by the markings 88, 94 shown in FIG. 2. Other ratios and numbers of markings 88, 94 may be used, but these figures were selected based on the diameter of the tires 30 and the construction of the nozzles of printheads 70–76, which have a 1/600 of an inch centerline-to-centerline nozzle spacing in the Y-direction between adjacent nozzles in an array. Preferably, the advance rate of the media (also in the Y-direction) may be tracked in 1/600 of an inch increments, or in multiples of 1/600 of an inch (such as 4/600 of an inch, which equals 1/150 of an inch) to advantageously simplify computations conducted by the controller 40 in accordance with the present invention, as described further below. The higher resolution outer track 90 is used in the media advancing operation, while the lower resolution inner track 95 is used for run-out correction to compensate for any lack of concentricity in the encoder wheel 85 in an assembled printer 20, as described in U.S. Pat. No. 5,774,074, mentioned in the Background section above.

One or more of the markings, such as an origin mark 96, may be different than the remainder of the markings 88, 94 to identify a particular radial or angular position of the encoder wheel 85, and hence, of the drive tires 30, which may be used as a reference or starting position. In the illustrated embodiment, the origin marking 96 is three times the width of the other markings 94 of track 95 to be readily recognized by the sensors 82 and/or 84, allowing other readings to be referenced to the origin mark 96. Alternatively, the origin position may be indicated by the absence of one or more markings 94 at a particular location on the encoder wheel 85. The angular position of the origin mark 96 may then be correlated with a media sensor 98 as shown in FIG. 1, which may be mounted, for instance, along the upper periphery of one of the drive tires 30. The media sensor 98 provides feed-back to the controller 40 as to when a leading edge of a fresh sheet of media has passed by the sensor 98, traveling from the supply tray 28 to the printzone 25.

As shown in FIG. 2, the controller 40 delivers firing signals 100, 102, 104 and 106 to the respective printheads 70, 72, 74 and 76 through the multi-conductor flexible strip 78 to determine the order of firing the nozzles to print a selected image. When the hardcopy device 20 has image scanning capabilities, the controller 40 receives a scan signal 107 through conductor 78 from the scanning device 50', indicative of an image previously recorded on the print media. These firing signals 100–106 are coordinated with a media advance signal 108 delivered from the controller 40 to the media advance motor 35 to print the selected image in accordance with an image input signal 110 received from a host device, such as a personal computer 112. When the hardcopy device 20 has image scanning capabilities, the controller 40 delivers an image output signal 111 to the computer 112 for further electronic processing, such as for incorporation into other documents or for transmission through electronic mail ("E-mail"). The controller 40 also receives a leading edge signal 114 generated by the media sensor 98, a run-out correction signal 116 from the inner track media sensor 82, and a fine resolution media advance signal 118 from the outer track media sensor 84.

Figure 3:
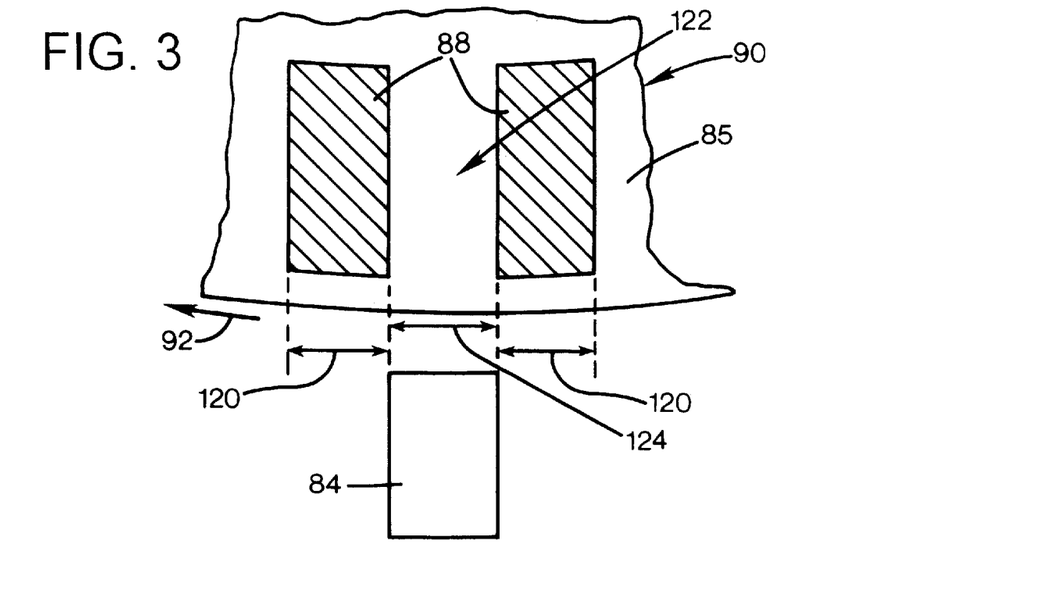
FIG. 3 is an enlarged schematic view of a portion of an encoder wheel and an encoder sensor of the streamlined optical encoder system of FIGS. 1 and 2.

FIG. 3 schematically illustrates how the sensors 82 and 84 generate the signals 116 and 118 by using the outer track sensor 84 as an example. Here, in an enlarged view, we see the outer track markings 88 moving past the sensor 84 as the encoder wheel 85 rotates in the direction of arrow 92. During time intervals 120 that the markings 88 pass the sensor 84, minimal light is received by the sensor 84, and the sensor is in an inactivated or OFF state. Preferably, the encoder disk is of a transparent or translucent material, through which light passes when a non-marked region 122 of the track 90 passes sensor 84, causing the sensor 84 to turn full-on to an activated or ON state. Rather than generating a square wave of strict ON/OFF signals like a digital device, the sensor 84 transitions between the ON and OFF states proportionally to the area which is blocked from view by a marking 88. Ideally, the sensor 84 generates an output signal 118 having a triangular waveform, but in practice, due to collumation errors of light, the waveform peaks and valleys are rounded, resulting in a sinusoidal waveform, assuming that the markings 88 are of equal width and spacing from one another. This sinusoidal output signal 118 has a period equal to the sum of one time interval 120 and one time interval 124.

Figure 4:
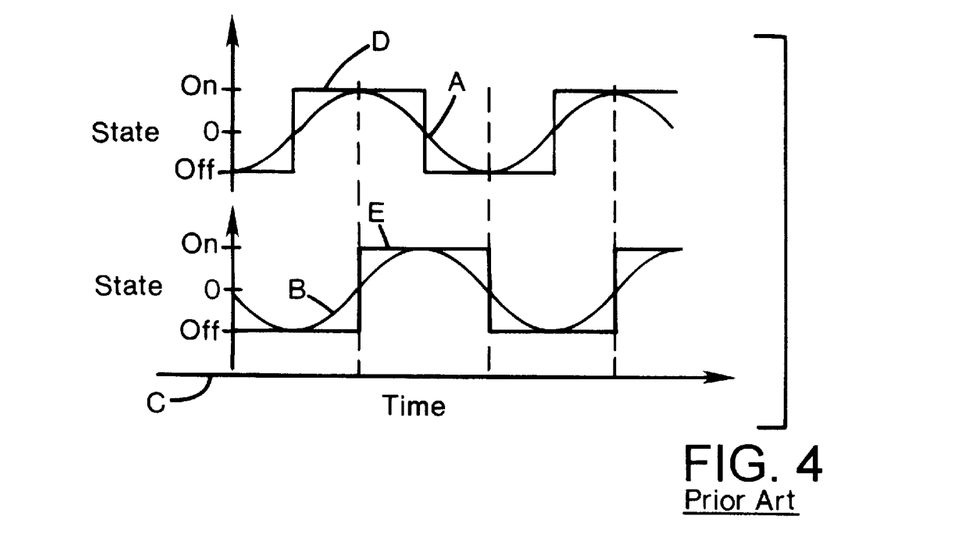
FIG. 4 is a graph of output signals of an expensive prior art encoder sensor.

Before delving into the operational details of the streamlined optical encoder system 80, an understanding of the operation of the earlier encoder system which required an expensive two-channel analog encoder, in addition to a single channel encoder as mentioned in the Background section above, will be helpful. FIG. 4 shows the two quadrature output signals as curves A and B graphed along a time ordinate C. The ON/OFF transitions for curves A and B, as the respective non-marked and marked regions of an encoder wheel move past this earlier sensor are shown as square waves D and E, respectively. For any particular point in time, it can be seen that curve A leads curve B by 90°, hence, the signals are considered to be in quadrature. A dual signal quadrature system was required to determine the direction of rotation of the encoder disk, which corresponds to the direction of rotation of the media feed tires 30. By knowing the offset between the signals is 90°, the direction of rotation may be inferred from the rising or falling of curves A and B.

Use of a single curve to interpret this rotational information was not possible because at the peaks and valleys of a curve there is minimal change in the signal, so the position of the encoder could not be accurately determined. When one of the quadrature signals was at either a peak or a valley, the other signal was used for positional feedback because it was either rising or falling as the media moved. This relationship is seen along the dashed vertical lines in FIG. 4, where when curve A is at a peak, curve B is rising, and when curve A is at a valley, curve B is falling. Using only a single curve, there are deadband areas were no rotational information can be determined, so the use of a dual-channel sensor was considered to be a requirement of this earlier media position feed-back system.

Given this state of the art, the inventors were challenged with finding a way to eliminate the earlier expensive dual-channel sensor and replace it with a more economical system, such as one using the single channel sensor 84. Accomplishing this feat required a re-examination of the basic assumptions underlying the earlier system. One feature questioned was the need to determine the direction of rotation. The inventors began their quest with a new premise, specifically, assuming that the direction of rotation is always in the media feeding direction of arrow 92. Given this new premise, there was no longer a need for generating two signals in quadrature to determine direction of rotation, yet, there remained the problem of gaining information during the deadband areas of a single curve at the peaks and valleys.

Figure 5:
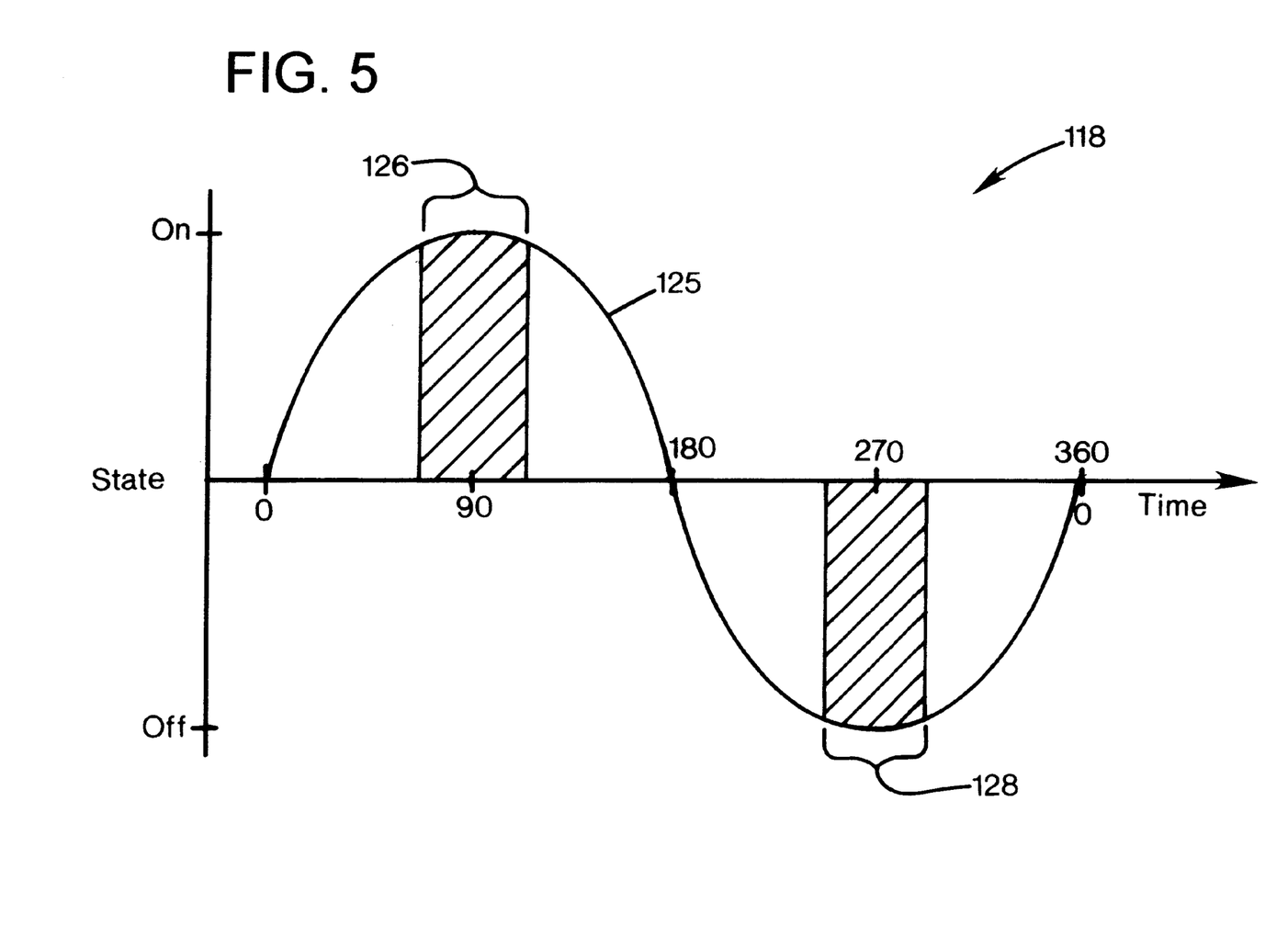
FIG. 5 is a graph of an output signal provided by the encoder sensor of FIGS. 1–3.

FIG. 5 shows atypical output curve 125 for signal 118 as having a peak deadband or indeterminate region 126 and a valley deadband or indeterminate region 128, indicated by the region of curve 125 bordering the hatched areas just before and just after both the 90° and the 270° locations on curve 125. If the resolution of the encoder is selected to be an integer multiple of the print resolution, positioning in the indeterminate regions would not be required. The encoder could always be positioned at a zero-crossing (0° or 180°), but this is not true if the encoder wheel has run-out. To correct for this run-out, the controller 40 uses the low resolution track signal 116, generated by sensor 82, which is located 180° from the high resolution sensor 84. The inventors considered how this waveform 125 could be used, because other than in the indeterminate regions 126 and 128 the curve 125 contained useful information on the media position in the printzone 25. The output curve 125 may be used by controller 40 to indicate the media advance as long as no positional information was needed in the indeterminate regions 126, 128. It occurred to the inventors that another way to shift the Y-direction position of the droplets relative to the media, other than moving the media in printzone 25 into a location where sensor 84 would generate a signal 118 in an indeterminate region 126 or 128 of curve 125, was to avoid moving the media into the indeterminate regions 126 and 128 and instead, to shift which nozzles in the array were printing the image.

Figure 6:
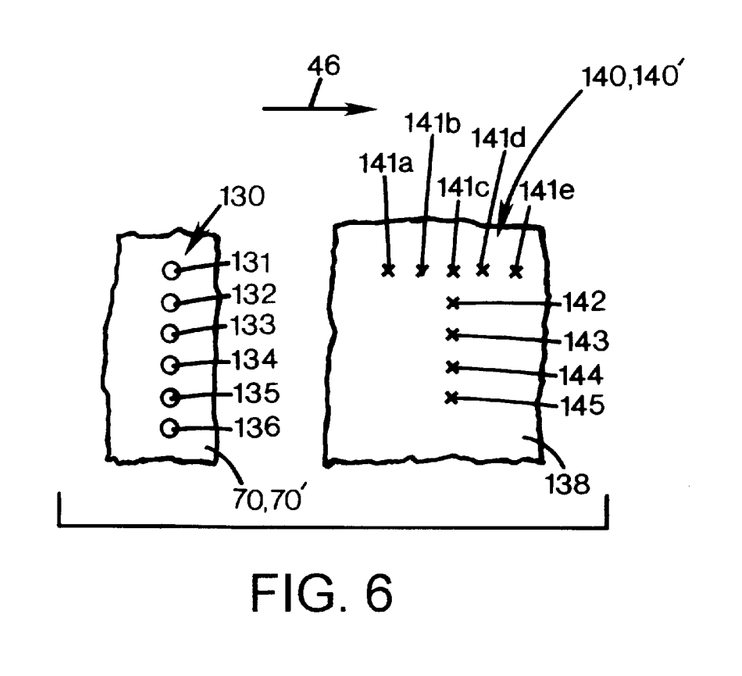
FIG. 6 is an enlarged, partially schematic view of a portion of an image transceiver head of the hardcopy device, along with a portion of sheet of media showing desired locations for printing ink droplets or for reading a previously recorded image on the media, according to a normal printing routine.

FIG. 6 schematically shows an element group 130 of discrete interaction elements 131–136 which form a portion of one of the linear arrays of nozzles on the black printhead 70, or a portion of one of the linear arrays of image receptors on the scanhead 70'. A portion of a sheet of media 138 is shown with the locations marked for droplets to land to print a selected image 140, here, a T-shaped figure, using the black printhead 70, or the location of an image 140' previously printed on sheet 138 for reading by the scanhead 70'. Each droplet location is indicated by the character "X", including locations 141a, 141b, 141c, 141d and 141e which form a cross bar portion of the T-shape, and locations 142, 143, 144 and 145, which along with location 141c form an upright portion of the T-shape.

Figure 7:
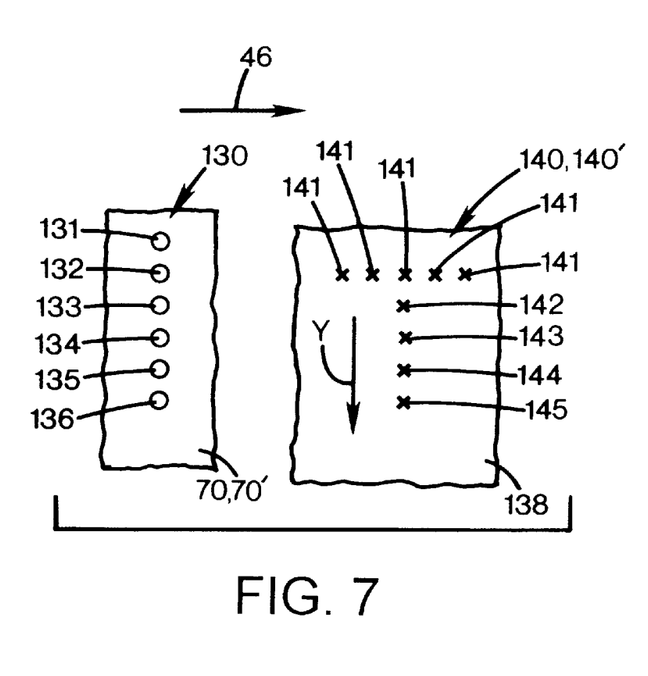
FIG. 7 is an enlarged, partially schematic view of the portion of the image transceiver head of the hardcopy device, along with the media of FIG. 6, showing printing and or scanning according to a shifted element routine of the present invention.

The relative vertical locations of the droplet locations for image 140, 140' with respect to the group of interaction elements 130 in FIGS. 6 and 7 are indicative of which nozzles are used to print which droplets to print the T-shaped image, or of which image receptors are used to read which droplets of a previously printed image 140'. FIG. 6 shows the selected nozzles for printing image 140, as well as the image receptors for reading the existing image 140', when the positional feed-back signal 118 is in the normal region of curve 125, that is, when the signal 118 is not in one of the indeterminate regions 126, 128. In this normal mode of FIG. 6, the ink droplets at the cross bar locations 141a–141e are transceived by the interaction element 131 as the carriage 45 moves the pen 50 across the printzone 25 along the scanning axis 46. To print the remainder of the upright portion of the T-shaped image 140, element 132 prints at location 142, element 133 prints at location 143, element 134 prints at location 144, and element 135 prints at location 145. In this normal printing mode, nozzle 136 is a spare or unused nozzle, which is preferably located at or near an end of the linear array. To read the remainder of the upright portion of the existing T-shaped image 140', element 132 reads the droplet at location 142, element 133 reads the droplet at location 143, element 134 reads the droplet at location 144, and element 135 reads the droplet at location 145. Current printhead and printer designs often leave one or two typically unused nozzles at each end of the two linear arrays as spares, which may be used in a pen-to-pen alignment routine. Scanheads 70' may also be constructed to have one or more spare image receptors at one or both ends of the receptor array.

FIG. 7 illustrates a shifted mode used to avoid the indeterminate regions 126 and 128 when scanning or printing. Suppose instead of showing a normal situation, FIG. 6 shows a proposed media move which would position the encoder wheel 85 in a location where the output signal 118 of sensor 84 would be in one of the indeterminate regions 126 or 128. To avoid this situation where the sensor output is not useful to the controller 40, FIG. 7 shows a modified media advance step in conjunction with an interaction element shifting routine which still positions the image 140, 140' at the desired location on the media 138. Rather than advancing the media sheet 138 to an undesirable location, the sheet is moved one interaction element spacing further in the Y-direction, and the selected nozzles used to print image 140, and image receptors used to read existing image 140' are also shifted in the positive Y-direction of the media advance. As shown in FIG. 7, the shifted printing mode uses nozzle 132 to print droplets at the cross bar locations 141a–141e as the carriage 45 transports the pen 50 across the printzone 25 along the scanning axis 46. The remainder of the upright portion of the T-shaped image 140 is formed by nozzle 133 printing at location 142, nozzle 134 printing at location 143, nozzle 135 printing at location 144, and the spare nozzle 136 printing at location 145. In this shifted print mode, nozzle 131 remains inactive. For scanning, the shifted reading mode uses image receptor 132 to read droplets at the cross bar locations 141a–141e as the carriage 45 transports the scanhead 50' across the scanzone 25 along the scanning axis 46. The remainder of the upright portion of the T-shaped image 140 is read by image receptor 133 at location 142, by image receptor 134 at location 143, by image receptor 135 at location 144, and by the spare image receptor 136 printing at location 145. In this shifted scanning mode, the image receptor 131 remains inactive. While FIG. 7 illustrates an over-advance media movement in combination with a downstream interaction element shift (in the positive Y-direction) of a single element, it is apparent that this shifting may be by more than one element if more spare elements are available. Indeed, the media sheet 138 may also be under-advanced in conjunction with an upstream interaction element shift in the negative Y-direction.

This interaction element shifting routine is really a matter of providing relative movement between the media and the interaction elements, but the logic of this concept flew in the face of conventional thinking concerning this relative motion, which centered on the concept of moving only the media. Nozzle shifting was used in the past for pen-to-pen alignment operations. To the best of the inventors' knowledge, a nozzle shifting printing mode has not been used to avoid moving the media to a location where the positional signal 118 would otherwise be in an indeterminate region 126, 128.

The controller 40 moves into the shifted element mode of FIG. 7 to avoid the indeterminate regions 126 and 128 of curve 125. To assist in speeding computational time of the controller 40, it is advantageous to select the relative diameter of the media drive tires 30 and the relative number and spacing of the sensor-read markings 88 of the fine resolution track 90, to produce a waveform 125 which has a length or period that is a multiple of the centerline-to-centerline spacing of adjacent interaction elements, such as elements 135 and 136. Here, the period of one full waveform 125 was selected to equate to 4/600 of an inch, which equals 1/150 of an inch, of media advance in the Y-direction of FIG. 1. Thus, one-quarter of a waveform equates to 1/600 of an inch of media advance, which is also the centerline-to-centerline interaction element spacing in the Y-direction between adjacent elements in the arrays. It is apparent that other values may be used for these dimensions and waveforms without departing from the concepts discussed by way of illustration herein.

In scanning operation, the printer controller 40 initially makes a determination as to how far the media should be advanced in a step between scan swaths to read the existing image 140' with the desired resolution quality, e.g. draft quality or photographic quality. The controller 40 then predicts whether the initial media step decision would land the encoder wheel 85 in a location where the sensor 84 would yield an output signal 118 along one of the indeterminate regions 126 or 128 (FIG. 5). If so, then the controller 40 establishes a new media advance step by adjusting the initial step by one or more spare image receptor spacings, and the controller then also adjusts which image receptors 131–136 are used to read the existing image 140', as shown for the shift between FIGS. 6 and 7. When the image receptor(s) are located in the downstream or positive Y-direction, then the media is over-advanced from the initial step in the positive Y direction to position the media where the spare image receptor(s) may read at the desired location on the media. Conversely, when the spare image receptor(s) are located in the upstream or negative Y-direction, then the media is under-advanced (in the positive Y-direction) from the initial step determination to position the media to read image 140' using the spare image receptor(s) at the desired location. The output image signal 111 is then delivered to the host computer 112.

In printing operation, a data signal 110 concerning a desired image to be printed is sent from the host device 112 to the printer controller 40 where determinations are made initially as to how far the media should be advanced in a step between print swaths to print with the desired print modes for a selected print quality, e.g. draft quality or photographic quality. The controller 40 then predicts whether the initial media step decision would land the encoder wheel 85 in a location where the sensor 84 would yield an output signal 118 along one of the indeterminate regions 126 or 128 (FIG. 5). If so, then the controller 40 establishes a new media advance step by adjusting the initial step by one or more spare nozzle spacings, and the controller then also adjusts the firing signals 100–106 to use the spare nozzle(s) to print, as shown for the shift between FIGS. 6 and 7. When the spare nozzle(s) are located in the downstream or positive Y-direction, then the media is over-advanced from the initial step in the positive Y direction to position the media where the spare nozzle(s) may eject the ink at the desired location on the media. Conversely, when the spare nozzle(s) are located in the upstream or negative Y-direction, then the media is under-advanced (in the positive Y-direction) from the initial step determination to position the media to receive ink from the spare nozzle(s) at the desired location.

As a simple example of this shifted printing routine, if the initial media step decision was proposed to move the media one-half inch, and the nozzle centerline spacing was at 1/600 of an inch, then this initial step would advance the media 300/600 of an inch. Suppose the controller 40 predicts that this proposed advance would position the sensor output signal 118 at the 270° location along curve 125, which is in the middle of the indeterminate region 128. Using the example of FIGS. 6 and 7 where a single spare nozzle 136 is located in the downstream direction, the controller 40 then establishes a new media step that over-advances the sheet 138 by 1/600 of an inch from the initial proposed step, resulting in an adjusted new media step of 301/600 of an inch. The controller 40 also then adjusts which nozzles 131–136 eject ink to print image 140 at the desired location on media 138, here, by shifting the selected nozzles in the downstream direction to print with nozzles 132–136 (FIG. 7), rather than with the normally selected nozzles 131–135 (FIG. 6).

It is apparent that a variety of modifications may be made to the streamlined optical encoder system 80 while still implementing the core principles illustrated herein. For instance, magnetic sensors may be used instead of the illustrated optical sensors 82, 84, with the markings 94 and 88 on the encoder wheel 85 being of a magnetic material. As an alternate modification, rather than using a plastic disk having indicia marked or etched thereon, the encoder wheel 85 may be constructed of a material, for instance a metallic material, having a series of slots cut therein at the locations of the illustrated markings 88, 94. As mentioned above, the nozzle shifting or image receptor shifting may occur in either the media upstream or downstream directions, with this shifting occurring across one or more interaction elements, as dictated by the controller 40. Other such modifications may be made without departing from the inventive concepts herein which are only shown by way of illustration with respect to the drawings and related discussion.

CONCLUSION

Thus, a variety of advantages are realized using the a streamlined optical encoder system 80. For instance, printing or scanning continues even when the positional sensor signal 118 normally would be in an indeterminate region 126, 128 where the exact media position cannot be ascertained. Another significant advantage of the streamlined optical encoder system 80 is the substitution of an economical single channel analog encoder sensor 84 for an expensive two channel analog encoder sensor, which was required in an earlier printer as discussed above. Thus, by using the streamlined optical encoder system 80 and adjusting the ink ejection of the nozzles, and/or the reading of the image receptors, the resulting elimination of an expensive sensor provides consumers with a more economical printing unit.

We claim:

1. A method of printing an image at a desired location on media in a printzone of an inkjet printing mechanism using an inkjet printhead having plural ink-ejecting nozzles arranged in a linear array, the method comprising the steps of:

proposing an initial media step to advance the media through the printzone;

generating a media position signal indicative of the position of the media in the printzone, with the media position signal having an indeterminate region during which the media position cannot be ascertained;

predicting whether the initial media step positions the media where the media position signal is in the indeterminate region;

selecting nozzles to print the image at the desired location on the media;

when the predicting step determines the media position signal is in the indeterminate region, (a) establishing a new media step to advance the media through the printzone and (b) shifting the selected nozzles to other nozzles along the linear array;

advancing the media the new media step; and following the advancing step, ejecting ink from said other nozzles in the linear array to print the image on the media at the desired location.

2. A method according to claim 1 wherein the shifting step comprises shifting the selected nozzles by one nozzle location in the linear array.

3. A method according to claim 1 wherein the generating step comprises generating a position signal having a periodic waveform with a period selected to correspond to a multiple of a centerline-to-centerline spacing distance between adjacent nozzles in the linear array.

4. A method according to claim 3 further including the step of generating a second media position signal including a reference signal corresponding to a reference position of the media.

5. A method according to claim 1 wherein:

the advancing step comprises advancing the media in a first direction through the printzone; and the shifting step comprises shifting the selected nozzles in said first direction in the linear array.

6. A method according to claim 1 wherein the establishing step comprises establishing a new media step which is smaller than the initial media step.

7. A method according to claim 1 further including the step of ejecting ink from said selected nozzles when the predicting step determines the media position signal is not in the indeterminate region.

8. A method according to claim 1 wherein the plural ink-ejecting nozzles of the inkjet printhead are arranged in two linear arrays, and the shifting step comprises shifting said selected nozzles to other nozzles along each of the two linear arrays.

9. A method according to claim 1:
   wherein the generating step comprises generating a position signal having a periodic waveform with a period selected to correspond to a multiple of a centerline-to-centerline spacing distance between adjacent nozzles in the linear array;
   further including the step of generating a second media position signal including a reference signal corresponding to a reference position of the media;
   wherein the advancing step comprises advancing the media in a first direction through the printzone, and the shifting step comprises shifting the selected nozzles in a second direction opposite said first direction in the linear array; and
   further including the step of ejecting ink from said selected nozzles when the predicting step determines the position signal is not in the indeterminate region.

10. An inkjet printing mechanism, comprising:
    an inkjet printhead having plural ink-ejecting nozzles arranged in a linear array to selectively eject ink in a printzone in response to a firing signal to print an image on media at a desired location;
    a media advancing member which rotates to advance media through the printzone in response to a media advance signal to receive ink ejected from selected nozzles;
    an encoder member coupled to rotate with the media advancing member, with the encoder member having indicia;
    a sensor member positioned to interpret the indicia of the encoder member and generate a media position signal indicative of the position of the media in the printzone, with the media position signal having an indeterminate region during which the media position cannot be ascertained; and
    a controller which generates the media advance signal and the firing signal, with the controller (a) adjusting the media advance signal to avoid moving the media to a position where the media position signal is in the indeterminate region and (b) shifting said selected nozzles to other nozzles along the linear array to print the image at the desired location on media.

11. An inkjet printing mechanism according to claim 10 wherein the indicia of the encoder member comprises markings, and the sensor member comprises an optical sensor.

12. An inkjet printing mechanism according to claim 10 further including a media sensor encountered by media before being advanced through the printzone, with the media sensor generating a leading edge signal when encountering a leading edge of a fresh sheet of media, and wherein the controller correlates the leading edge signal with the media position signal to generate the firing signal.

13. An inkjet printing mechanism according to claim 10 wherein the plural nozzles of the printhead include a group of nozzles centrally located in the linear array, and at least one spare nozzle located at one end of the array, with controller generating the firing signal to shift ink ejection to the spare nozzle.

14. An inkjet printing mechanism according to claim 13 wherein the media advancing member rotates to advance media through the printzone in a first direction, and the spare nozzle is located at the end of the array opposite said first direction.

15. An inkjet printing mechanism according to claim 10:
    wherein the indicia of the encoder member comprise markings, and the sensor member comprises an optical sensor;
    further including a media sensor encountered by media before being advanced through the printzone, with the media sensor generating a leading edge signal when encountering a leading edge of a fresh sheet of media;
    wherein the controller correlates the leading edge signal with the media position signal to generate the firing signal; and
    wherein the plural nozzles of the printhead include a group of nozzles centrally located in the linear array, and at least one spare nozzle located at one end of the array, with controller generating the firing signal to shift ink ejection to the spare nozzle.

16. A method of coordinating operation of a reciprocating head with media advance through an interaction zone of a hardcopy device across which the head reciprocates, with the head having plural interaction elements arranged in a linear array to selectively interact with media in the interaction zone, the method comprising the steps of:
    proposing an initial media step to advance the media through the interaction zone;
    generating a media position signal indicative of the position of the media in the interaction zone, with the media position signal having an indeterminate region during which the media position cannot be ascertained;
    predicting whether the initial media step positions the media where the media position signal is in the indeterminate region;
    selecting interaction elements to interact with the media at a desired location on the media;
    when the predicting step determines the media position signal is in the indeterminate region, (a) establishing a new media step to advance the media through the interaction zone and (b) shifting the selected interaction elements to other interaction elements along the linear array;
    advancing the media the new media step; and
    following the advancing step, reciprocating the head through the interaction zone while operating said other interaction elements in the linear array to interact with the media at the desired location.

17. A method according to claim 16 wherein:
    the head comprises a scanhead, the interaction zone comprises a scanzone, the plural interaction elements each comprise an image receptor, and the selecting step comprises selecting image receptors to interact with the media at a desired location on the media;
    shifting the selected image receptors to other image receptors along the linear array; and
    the reciprocating step comprises reciprocating the scanhead through the scanzone while operating said plural image receptors in the linear array to interact with the media through the step of reading an existing image when encountered at the desired location on the media.

18. A hardcopy device, comprising:

a media advancing member which advances media in a first direction through an interaction zone in response to a media advance signal;

a reciprocating head having plural interaction elements arranged in a linear array substantially parallel to the first direction, with selected interaction elements interacting with media in the interaction zone;

an encoder member having indicia to track media advance through the interaction zone;

a sensor member positioned to interpret the indicia of the encoder member and generate a media position signal indicative of the position of the media in the interaction zone, with the media position signal having an indeterminate region during which the media position cannot be ascertained; and a controller which generates the media advance signal and adjusts the media advance signal to avoid moving the media to a position where the media position signal is in the indeterminate region, wherein the controller is in communication with the plural interaction elements to shift said selected interaction elements to other interaction elements along the linear array to transceive the image at a desired location on the media.

19. A hardcopy device according to claim 18 wherein:

the media advancing member rotates to advance media through the printzone in response to the media advance signal; and the encoder member is coupled to rotate with the media advancing member.

20. A hardcopy device according to claim 18 wherein the head comprises a scanhead, the interaction zone comprises a scanzone, and the plural interaction elements each comprise an image receptor which generates an output signal delivered to the controller to read an existing image at the desired location on media.

* * * * *